United States Patent
Sidor et al.

(10) Patent No.: US 7,820,956 B2
(45) Date of Patent: Oct. 26, 2010

(54) OPTICAL POSITION TRANSDUCER SYSTEMS AND METHODS EMPLOYING REFLECTED ILLUMINATION FOR LIMITED ROTATION MOTOR SYSTEMS

(75) Inventors: Kurt Sidor, Plaistow, NH (US); Adam Pinard, Carlisle, MA (US); Kristopher Pruyn, Tyngsborough, MA (US)

(73) Assignee: GSI Group Corporation, Bedford, MA (US)

( * ) Notice: Subject to any disclaimer, the term of this patent is extended or adjusted under 35 U.S.C. 154(b) by 0 days.

(21) Appl. No.: 11/757,462

(22) Filed: Jun. 4, 2007

(65) Prior Publication Data
US 2008/0013106 A1  Jan. 17, 2008

Related U.S. Application Data

(60) Provisional application No. 60/814,718, filed on Jun. 19, 2006.

(51) Int. Cl.
*G01D 5/34* (2006.01)
(52) U.S. Cl. ............ 250/231.13; 250/231.14; 250/231.17; 250/231.18; 356/616; 356/617; 356/622
(58) Field of Classification Search ........... 250/231.13, 250/231.14, 231.15, 231.16, 231.17, 231.18; 356/616, 617, 622
See application file for complete search history.

(56) References Cited

U.S. PATENT DOCUMENTS

| | | |
|---|---|---|
| 2,534,505 A | 12/1950 | Ergen |
| 3,392,283 A | 7/1968 | Tomek |
| 3,480,788 A | 11/1969 | Barbieri et al. |
| 3,938,890 A | 2/1976 | Flavell |
| 3,970,979 A | 7/1976 | Montagu |
| 3,983,391 A | 9/1976 | Clemons |
| 4,056,722 A | 11/1977 | Ray |
| 4,142,144 A | 2/1979 | Rohr |
| 4,207,463 A | 6/1980 | Iyeta |
| 4,286,760 A | 9/1981 | Couderc et al. |
| 4,528,448 A | 7/1985 | Doggett |
| 4,587,513 A | 5/1986 | Burrowes et al. |
| 4,652,747 A | 3/1987 | Ellis |
| 4,694,235 A | 9/1987 | Flowers |

(Continued)

FOREIGN PATENT DOCUMENTS

EP      0010221      4/1980

(Continued)

OTHER PUBLICATIONS

Montagu et al., "Moving Magnet Galvanometer Scanners: A New Generation", Presented at the Space Microdynamics and Accurate Control Symposium, Dec. 1, 1992, pp. 6-9.

(Continued)

*Primary Examiner*—Georgia Y Epps
*Assistant Examiner*—Kevin Wyatt
(74) *Attorney, Agent, or Firm*—Gauthier & Connors, LLP

(57) ABSTRACT

A position transducer system is disclosed for a limited rotation motor that includes an illumination source that directs illumination toward an illumination reflector that rotates with a rotor of the limited rotation motor, and a plurality of detector areas adjacent the illumination source for receiving modulated reflected illumination from the illumination reflector.

18 Claims, 5 Drawing Sheets

U.S. PATENT DOCUMENTS

| | | | |
|---|---|---|---|
| 4,806,751 A | | 2/1989 | Abe et al. |
| 4,864,295 A | | 9/1989 | Rohr |
| 5,099,386 A | | 3/1992 | Stokes |
| 5,235,180 A | | 8/1993 | Montagu |
| 5,424,632 A | | 6/1995 | Montagu |
| 5,530,576 A | * | 6/1996 | Jackson et al. .............. 398/131 |
| 5,671,043 A | | 9/1997 | Ivers |
| 5,844,673 A | * | 12/1998 | Ivers .......................... 356/138 |
| 6,356,045 B1 | * | 3/2002 | Newton et al. .............. 318/561 |
| 6,921,893 B1 | | 7/2005 | Petschik et al. |
| 2002/0014581 A1 | * | 2/2002 | Yamamoto et al. ..... 250/231.13 |
| 2004/0206894 A1 | | 10/2004 | Oka et al. |
| 2005/0023450 A1 | * | 2/2005 | Ito ........................ 250/231.13 |
| 2005/0116153 A1 | | 6/2005 | Hataguchi et al. |
| 2005/0274878 A1 | * | 12/2005 | Goldman et al. ....... 250/231.13 |
| 2006/0097051 A1 | | 5/2006 | Foo et al. |
| 2007/0057058 A1 | * | 3/2007 | Tan et al. ..................... 235/454 |

FOREIGN PATENT DOCUMENTS

| | | |
|---|---|---|
| EP | 1295090 | 3/2004 |
| JP | 63030705 | 2/1988 |

OTHER PUBLICATIONS

6800/CB6588 Mirror Positioning System Instruction Manual, Cambridge Technology, Inc., Watertown, MA 1989-Feb. 1, 1994, pp. 9-18.

Letter form Herbert L. Allen dated Apr. 28, 2009.

* cited by examiner

OPTICAL POSITION TRANSDUCER SYSTEMS AND METHODS EMPLOYING REFLECTED ILLUMINATION FOR LIMITED ROTATION MOTOR SYSTEMS

PRIORITY

The present application claims priority to U.S. Provisional Patent Application Ser. No. 60/814,718 filed Jun. 19, 2006.

BACKGROUND

The invention relates to limited rotation motors used to drive optical elements such as mirrors for the purpose of guiding light beams in scanners, and particularly relates to position transducers for such limited rotation motors.

Position transducers for limited rotation motors typically include a movable element that is attached to a rotor of a limited rotation motor, and a fixed element. For example, U.S. Pat. No. 3,970,979 discloses a capacitance position transducer that employs capacitive plates in determining the relative position of a rotor of a limited rotation motor. U.S. Pat. No. 4,864,295 also discloses a capacitive position transducer system. While capacitive position detection system as suitable for certain limited rotation motor applications, other applications require greater precision in position detection than that provided by capacitive position detection systems.

Position detection by optical sensing techniques have been disclosed in U.S. Pat. No. 5,235,180 using a pair of light emitting diodes, a rotating element that includes alternating diffusive and reflective surfaces attached to a rotor shaft, and a quad cell detector that receives reflected light from the rotating element's reflective surfaces.

U.S. Pat. No. 5,671,043 discloses a position detection system in which first and second light sources are directed toward an opaque element that is affixed to the rotor shaft. As the shaft rotates, the opaque element alternately blocks light from reaching four fixed position photocells that are positioned around the axis of rotation of the opaque element. U.S. Pat. No. 5,844,673 discloses a position detector that includes a fixed position axial light source that directs light toward a plurality of photodetectors that are positioned around the rotor shaft, and a butterfly-shaped blocking member that rotates with the rotor.

U.S. Pat. No. 6,921,893 discloses a position detection system for a scanning device that includes a pair of light sources on either side of a rotating shaft, a plurality of detectors that are fixed with respect to the shaft, and rotating light blocker that is interposed between the light sources and the detectors.

Such position detection systems, however, involve precise alignment and matching of light sources and photodetectors, and further require that the rotor shaft pass through the plane of the electronic circuitry, which increases manufacturing cost and alignment complexity. In certain applications it is also desired to provide a position detection system that has reduced drift, less sensitivity to mechanical misalignments and lower electrical noise, yet includes fewer parts, smaller size and lower manufacturing costs to produce.

There is a need, therefore, for an improved position detection system for a limited rotation motor system, and more particularly, there is a need for a position detection system for a limited rotation motor system that is efficient and economical to produce.

SUMMARY

The invention provides a position transducer system for a limited rotation motor in accordance with an embodiment that includes an illumination source and a plurality of detector areas. The illumination source directs illumination toward an illumination reflector that rotates with a rotor of the limited rotation motor, and the plurality of detector areas adjacent the illumination source for receiving modulated reflected illumination from the illumination reflector.

In accordance with another embodiment, the invention provides a position transducer system for a limited rotation motor that includes an illumination source that directs illumination toward an illumination reflector that rotates with a rotor of the limited rotation motor, and a plurality of sets of functionally complementary pairs of detector areas that are substantially co-planer with and surround the illumination source for receiving modulated reflected illumination from the illumination reflector.

In accordance with a further embodiment, the invention provides a method of providing a relative position signal in a limited rotation motor system. The method includes the steps of directing illumination from an illumination source toward an illumination reflector that rotates with a rotor of the limited rotation motor, and a receiving modulated reflected illumination from the illumination reflector at a plurality of sets of functionally complementary pairs of detector areas that are substantially co-planer with and surround the illumination source.

BRIEF DESCRIPTION OF THE DRAWINGS

The following description may be further understood with reference to the accompanying drawings in which.

Figure 1:
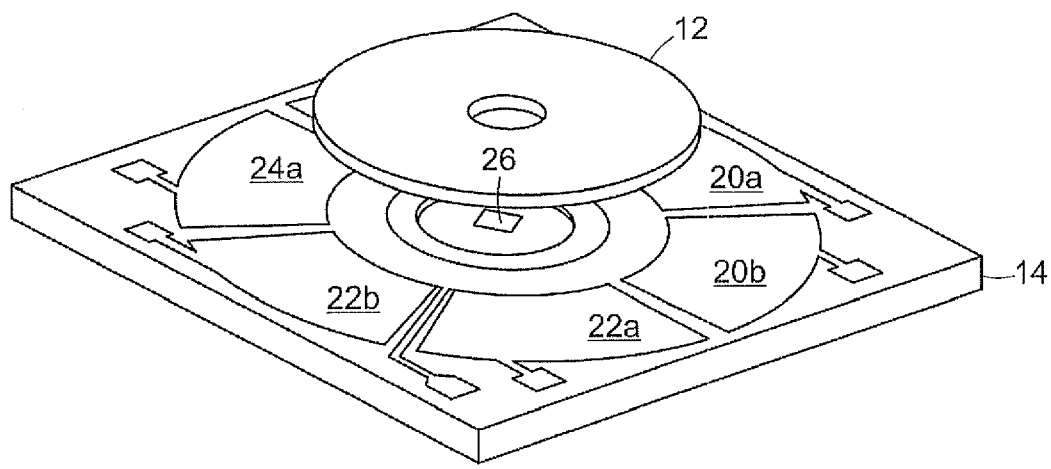
FIG. 1 shows an illustrative diagrammatic isometric view of a position transducer system in accordance with an embodiment of the invention.

The drawings are shown for illustrative purposes only.

DETAILED DESCRIPTION OF THE ILLUSTRATED EMBODIMENTS

In accordance with an embodiment, the invention provides a position transducer that includes a light source, a light modulator, a multi-segmented light detector and supporting electronic circuitry. The transducer operates by reflectively modulating the emitted radiation from the light source to different segments of an adjacent detector. The position transducer may be used with a limited rotation motor, and such limited rotation motors may be used for example, in a variety of laser scanning applications, such as high speed surface metrology. Further laser processing applications include laser welding (for example high speed spot welding), surface treatment, cutting, drilling, marking, trimming, laser repair, rapid prototyping, forming microstructures, or forming dense arrays of nanostructures on various materials. In further embodiments, the invention may be used in other applications, including reference input scanning and confocal microscopy as disclosed, for example, in FIG. 1 and the associated text of U.S. Pat. No. 5,252,923, which includes an objective 12, an object plane 14, an image plane 16, a laser source 18, a scan lens 20, a detector 26 and a raster-scan display 40 shown therein.

Figure 2:
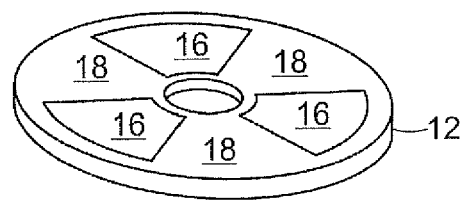
FIG. 2 shows an illustrative diagrammatic isometric bottom view of a reflector element in the position transducer system as shown in FIG. 1.
Figure 3:
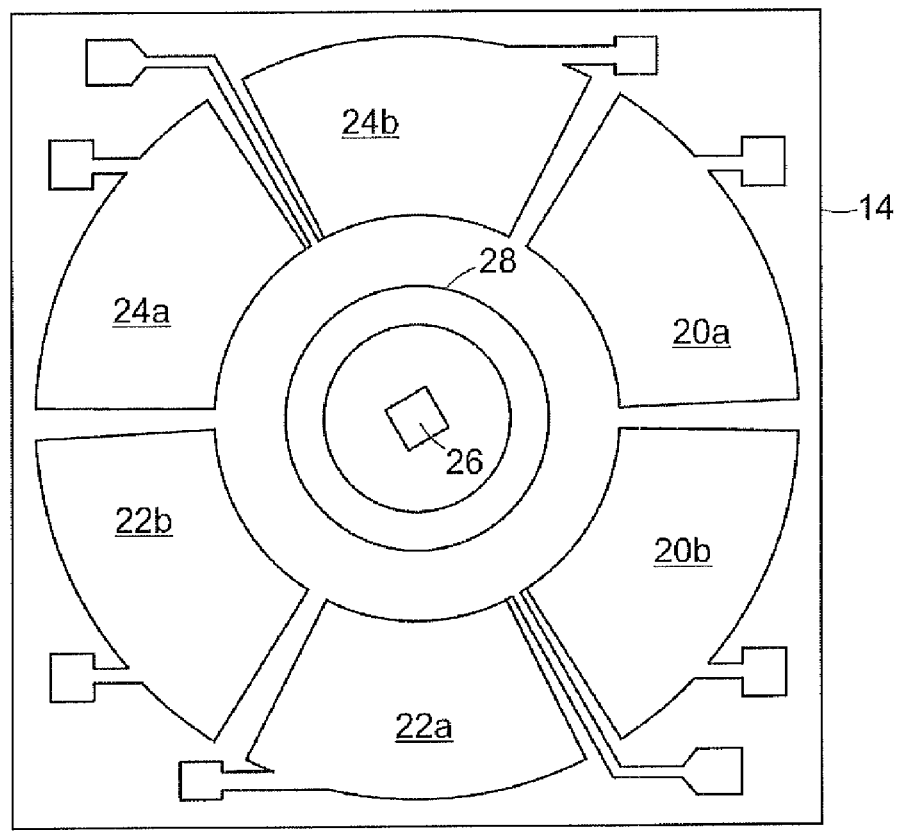
FIG. 3 shows an illustrative diagrammatic plan view of the light source and detector circuitry of the position transducer system as shown in FIG. 1.
Figure 4:
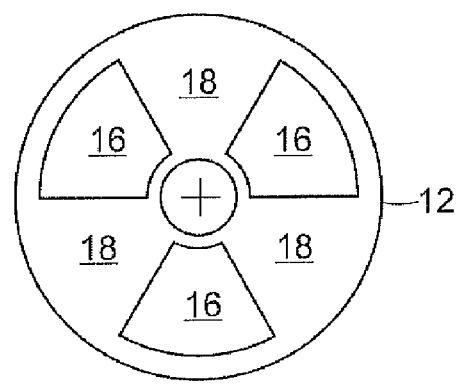
FIG. 4 shows an illustrative diagrammatic bottom view of the reflector element of FIG. 2.

As shown in FIG. 1, a system 10 includes a reflective light modulator 12 and a circuit substrate 14. The reflective light modulator 12 has three pairs of alternating reflective surfaces 16 and light absorbing surfaces 18 on the underside thereof as shown in FIGS. 2 and 4. The substrate 14 includes three pairs of segmented detector regions 20a and 20b, 22a and 22b and 24a and 24b (as farther shown in FIG. 3), a single light source 26 (such as a Luxeon DS25 LED Emitter as sold by Lumileds Lighting U.S. of San Jose, Calif.) and an optional light baffle 28 (e.g., an O-ring) that blocks any direct light that would otherwise project from the light source to any of the detector segments directly. Certain emitters may not require such a baffle. In various embodiments, the light source may be provided by a variety of types of emitters, and may father include an optical fiber or fibers that deliver the illumination to the device from a remote location.

The detector may also optionally include inactive regions (such as the central region under the detector) that may masked with an opaque layer such as a metal film to prevent light from reaching the substrate and creating charges in the substrate that can affect the signals. It is preferred that the detector regions 20a, 20b, 22a, 22b, 24a and 24b be formed of a single monolithic detector and contain six active areas constructed in a generally hexatropic manner as shown in FIG. 3, although it is possible to manufacture the array using discrete detectors having patterned active areas or a mask to define the active areas. It is also possible to make a system of an embodiment that includes 1, 2, 3 or more pairs of detectors although 3 is preferred for optical scanner galvanometers to obtain a wide scan angle and increased signal level as well as averaging. The LED light source 26, that preferably emits at 850 nm, is a single element and is mounted directly to the center of the detector in an inactive area of the detector. It is not necessary that the light source be an LED, as it could be a VCEL laser chip or phosphorescent dot or any small light source that emits a suitable cone shaped pattern of radiation such that may be modulated by the modulator and directed to the detectors uniformly without errant stray radiation. The central and peripheral regions of the reflective light modulator 12 are preferably absorptive, and the reflective regions 16 are primarily specular. It is preferred that absorptive regions (18) have substantial contrast to the specular regions at the wavelength of the emitter.

It is preferred that the light modulator is a rigid monolithic silicon structure that is patterned using a lithographic process where reflective regions are gold plated and absorptive regions are anti-reflective coated silicon. Alternatively, diffuse black such as black chrome, black nickel, or black oxide could be used on a silicon substrate or on another substrate such as but not limited to electroformed metal. Other embodiments could include composite structures, printed features or textured features such as laser or grit blasting. The modulator features could be created integral to the end of the rotor shaft. All that is required is reflective and non-reflective patterns of good geometry and suitable dimensions to selectively illuminate the detectors with the light source emissions. It is also possible that the absorptive regions are transmissive. A transmissive design would require precautions that light passing the modulator did not later impinge on the detectors, especially if it were modulated by the scan angle. The operation of the position detection signal processing may be similar to the processes disclosed, for example, in U.S. Pat. No. 5,235,180, the disclosure of which is incorporated herein by reference. Position transducers of the invention may be used with a variety of limited rotation motor systems such as the motor system of FIG. 3 and associated text of U.S. Pat. No. 5,235, 180, as well as the motor system of FIGS. 1-4 and associated text of U.S. Pat. No. 5,424,632, the disclosures of which are hereby incorporated by reference in their entirety.

Figure 5:
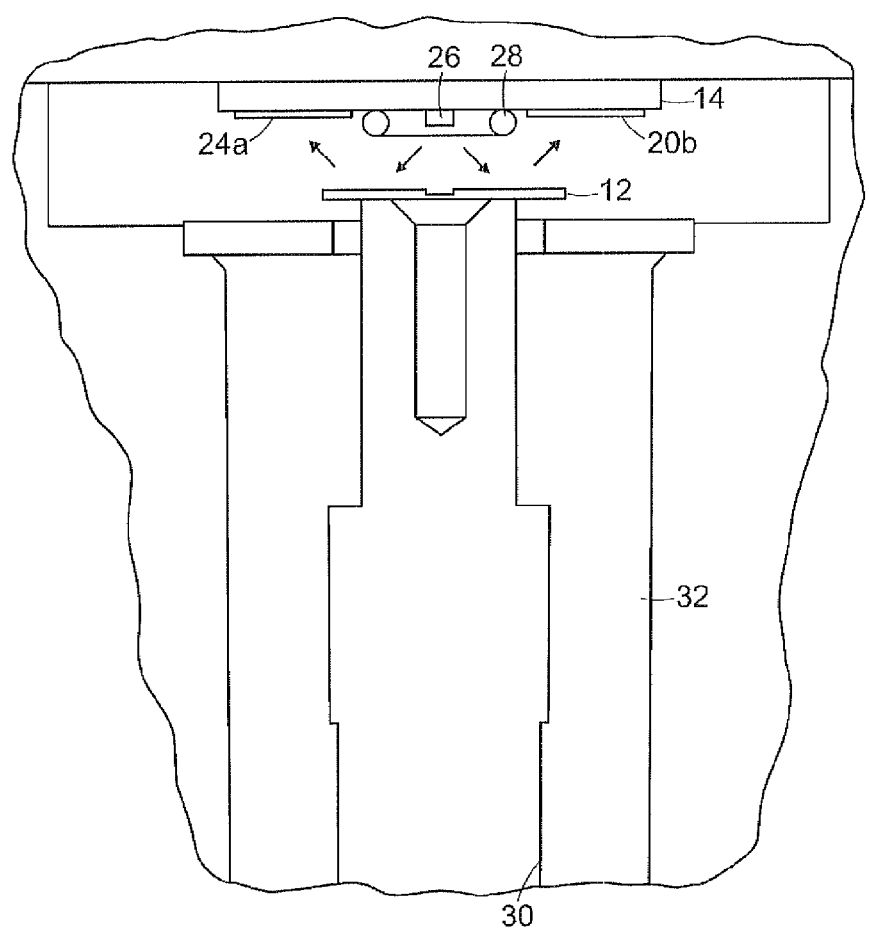
FIG. 5 shows an illustrative diagrammatic side sectional view of a limited rotation motor system in accordance with an embodiment of the invention.

As shown in FIG. 5, when a system of FIG. 1 is employed with a limited rotation motor system, the reflective light modulator 12 is coupled to the rotor shaft 30 which rotates within a housing 32. The circuit substrate 14 remains stationary as the rotor rotates, and the illumination from the LED source 26 is reflected from the reflective regions 16 of the rotating modulator 12 as the rotor 30 rotates. The system may also employ one or more optional self regulating PTC resistive heating elements, preferably on the reverse side of the circuit substrate 14 as a heater to minimize temperature induced variations.

Figure 6:
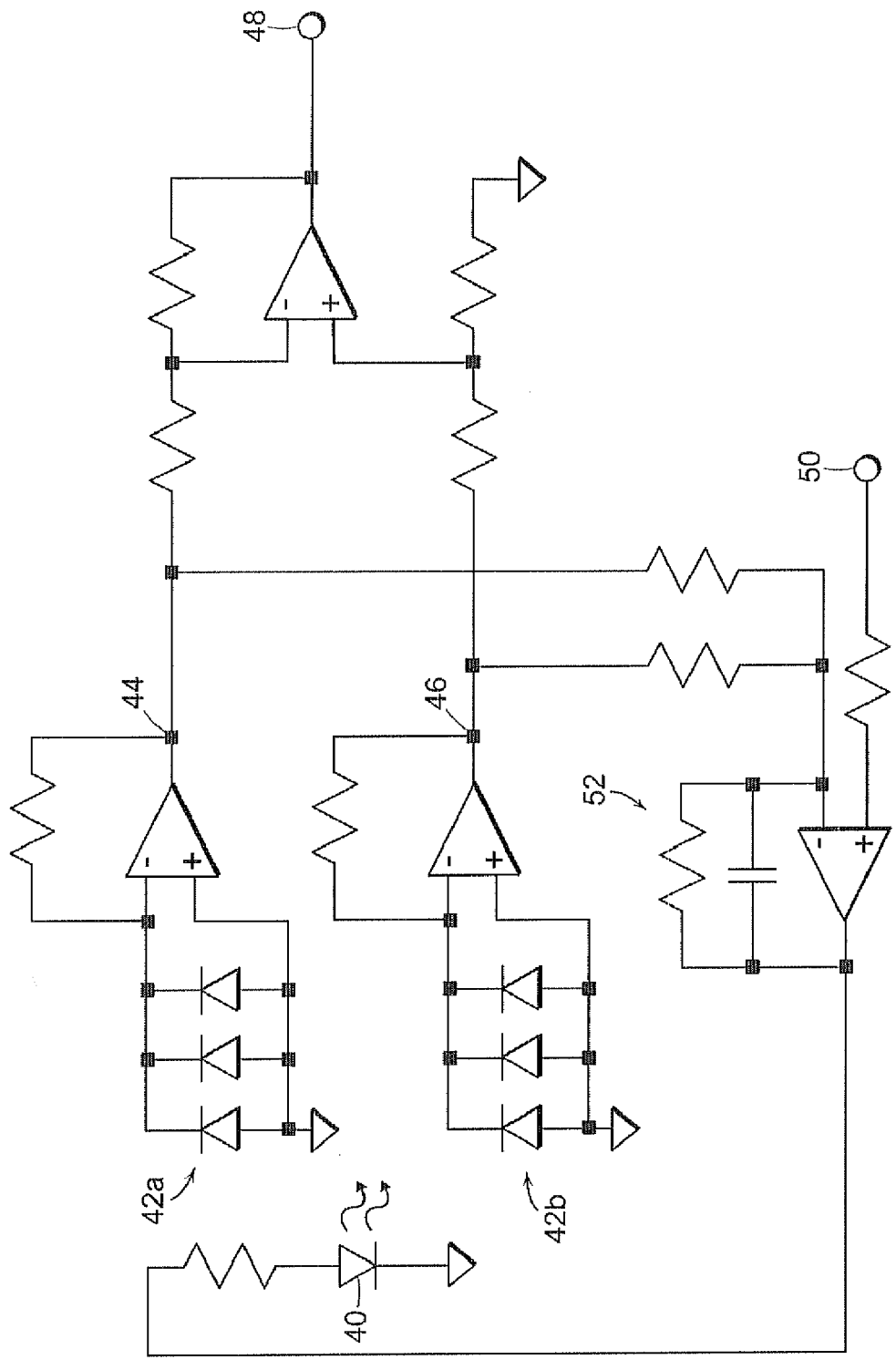
FIG. 6 shows an illustrative diagrammatic view of a circuit diagram of a position transducer system in accordance with an embodiment of the invention.

The position detection is achieved by monitoring each of the three pairs of detectors 20a, 20b, 22a, 22b, 24a and 24b for the instant when the signals from each pair indicate that the greater amount of relative illumination has switched from a first detector of a pair to a second detector of a pair. The range of motion of the rotor of the limited rotation motor is preferably less than the full angular range of each pair of detectors (e.g., less than 60 degrees and is preferably less than about 45 degrees, and more preferably may be about 40 degrees centered at the mid-point of a pair of detectors). Signals $V_a$ and $V_b$ are created by summing the a detectors and the b detectors. The position proportional signal is the difference between $V_a$ and $V_b$. In particular, the three regions of the detector 20a, 22a and 24a are summed for $V_a$ and the three regions of the detector 20b, 22b and 24b are summed for $V_b$. As shown in FIG. 6, the calculation is performed by an electronic circuit. The feedback loop contains an integrator 52 that integrates the error between $V_{ref}$(50) and $(V_a+V_b)$. The $V_{ref}$ signal (or target summed signal) may also be modified with another temperature sensitive or gain sensitive device thereby largely compensating for inherent temperature related parametric gain changes of the system.

As shown in FIG. 6, the circuit includes an LED 40 (as the light source 26 of FIG. 1), and a plurality of detector arrays 42a and 42b (as the pairs of detectors 20a, 22a, 24a and 20b, 22b and 24b). The average value of $V_a$ among the three sets of a detectors is provided at 44, and the average value of $V_b$ among the three sets of b detectors is provided at 46. The position proportional output is provided at node 48. A reference voltage is applied at node 50, and the negative feedback amplifier circuit 52 provides the detected signal level setpoint.

The output position therefore, is $(V_a-V_b)/(V_a+V_b)$. The circuit will regulate $(V_a+V_b)$ to be a mostly fixed gain. The term $(V_a+V_b)$ can be adjusted to compensate for temperature related gain drift. The value of the resistor ($R_{temp}$) in the negative feedback amplifier circuit 52, is chosen to compensate for a positive gain coefficient. A negative temperature coefficient is compensated for by moving one side of the $R_{temp}$ resistor from the inverting input to the non-inverting input of the amplifier. The compensation capitalizes on the large temperature sensitivity of the LED, although other feedback devices such as thermistors may also be used in other embodiments.

Figure 7:
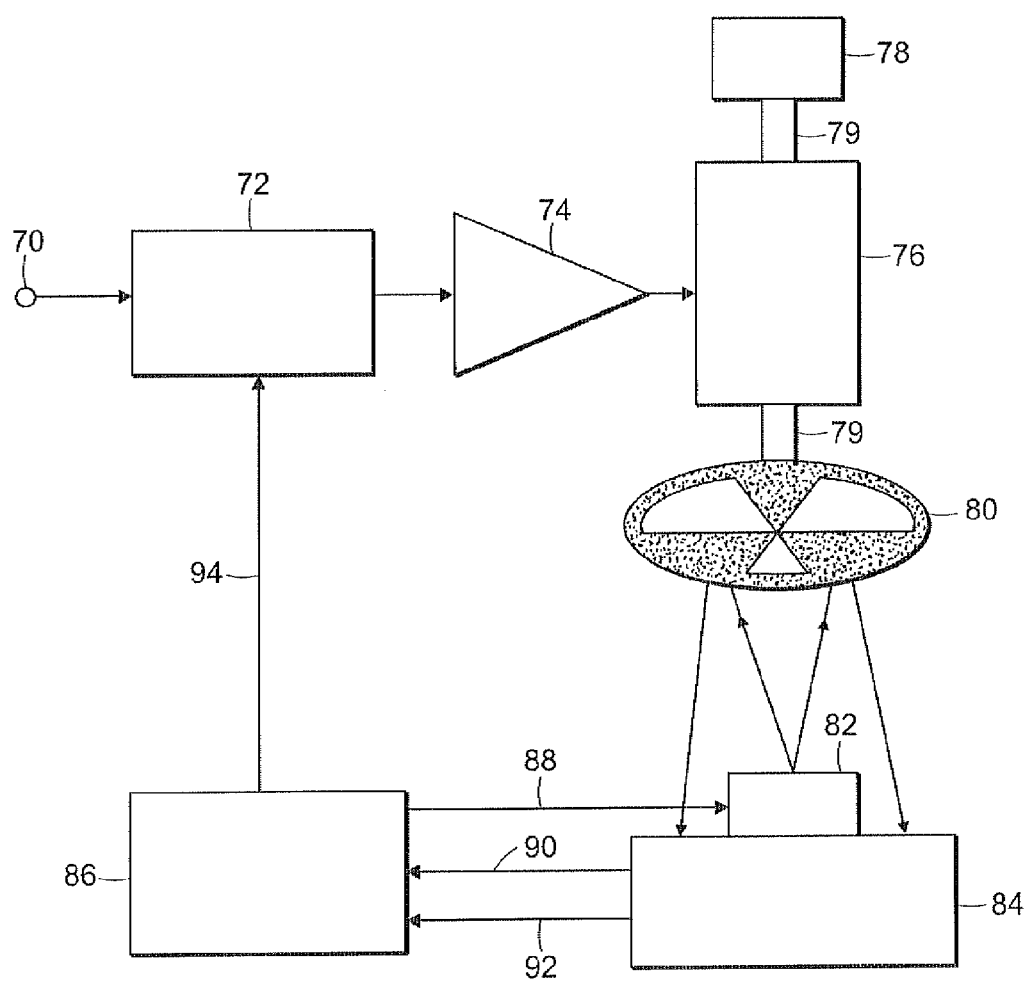
FIG. 7 shows an illustrative diagrammatic functional view of a position transducer system in accordance with a further embodiment of the invention.

FIG. 7 shows a functional block diagram of a system of the invention. A desired mirror angle is input at 70 to a servo controller 72 (e.g., PID controller or State Space controller etc.). The output of the controller 72 is provided to an amplifier 74, which in turn controls a limited rotation motor 76 that drives a load such as a mirror 78 on a rotor shaft 79. A reflective light modulator 80 is positioned on another portion of the rotor shaft 79, and illumination from an LED light source 82 is selectively reflected from the modulator 80. As the modulator 80 rotates, the illumination received by the detector regions on the substrate 84 provide signals to detector electronics 86 that include the circuit of FIG. 6. The signals 90 and 92 may be provided as a and b voltages ($V_a$ and $V_b$) or a and b currents ($I_a$ and $I_b$) with current output circuitry (not shown). The detector electronics also provide the LED voltage signal to the LED source 82, as well as a feedback angle signal 94 to the servo controller 72. In certain embodiments, the system may be integrated into a single printed circuit board. The feedback signal 94 may also be a differential signal proportional to $V_a$ and $V_b$ for noise immunity and compatibility with the servo controller.

The detector array may be formed of a monolithic device, and the light source and power lines may be mounted directly on the detector array. The shaped detector regions permit compensation for any non-linearity. The detector array and light source may be both located with any of the signal processing circuitry, amplifier circuitry, controller circuitry, or combination of these circuits. This construction also enables printing LED power traces directly onto the monolithic detector arrays. Systems of various embodiments of the invention provide, therefore, that a position transducer may include a monolithic detector array that is formed using circuit fabrication technology (rather than positioning discrete elements around an axis): The opposed, reflective construction allows a monolithic array with excellent placement of segments relative to one another, and well matched active areas. Systems of various embodiments of the invention also permit the light source mounted directly to detector: This ensures that the LED location does not change with respect to the detector array and allows easy integration on a PC board. The invention also provides that the circuit connections may be formed between the PC board, detector, and light source using short wire bonds.

The light baffle between light source and detector ensures that only the reflected modulated) light reaches the detector segments, which decreases noise. Because the reflective element is specular, a single LED die may be used, which provides a light source that approximates a point source. The use of a specularly reflective modulator is well suited for this source. The construction of the reflective and detection components is tripled and symmetrically positioned about the rotational axis, which yields improved signal performance and reduced sensitivity to mechanical misalignment.

Temperature compensating is also provided utilizing the LED current (or temperature sensing element of FIG. 6) as a basis for compensation. A self-regulating heater located on the detector 14 may also be used to stabilize operation. The system including the transducer 84 servo controller 72 and amplifier 74 on the same PC board provides efficient and economical manufacturing and maintenance. The construction, including a reflective modulator that is proximate a monolithic detector with integrated light source, allows for higher level of integration than previously possible. In accordance with further embodiments, the shapes of either the modulator or the detector array segments may be formed to further compensate for non-linearity. The system may also include guard rings on the detector to minimize crosstalk.

Limited rotation motors employing position transducers of the invention may be used, for example, in a laser drilling systems for producing vias (or holes) in printed circuit boards (PCBs). Such a system may include a pair of galvanometer based X-Y scanners as well as an X-Y stage for transporting the PCB, and a scan lens that provides for parallel processing of circuit board regions within the field covered by the scanners and lens. The X-Y stage transports the circuit board along rows and columns needed for entire coverage. The circuit board is typically substantially larger than the scan field.

Such limited rotation motors may also be used in multi-layer drilling systems in accordance with another embodiment of the invention. The operations may include hole punching (or percussion drilling) where one or more laser pulses form a single hole within an effective spot diameter without relative movement of the beam with respect to object, or may include trepanning (which does involve relative movement between the beam and the object during the drilling operation). During trepanning, a hole having a diameter substantially larger than a spot diameter is formed. A substrate is laser drilled from a top surface of the substrate to an exposed bottom surface of the substrate using a plurality of laser pulses that are preferably trepanned in a circle, but other trepanning patterns, such as ovals and squares, may be used. For example, a trepanning pattern of movement of the laser focal spot is one in which the beam spot starts in the center of the desired via, and gradually spirals outwardly to an outer diameter of the via. At that point the beam is caused to orbit around the via center for as many revolutions as is determined necessary for the particular via. Upon completion, the focal spot is caused to spiral back to the center and thereafter awaits the next command. An example of a trepanning velocity is 3 millimeters per second. In such drilling applications, it is sometimes advantageous to provide rapid point to point positioning of the beam with a rapid settling time irrespective of the trajectory between the points.

The overall drilling system throughput can be affected by many factors such as the required number of holes within a field, hole size, stage speed, etc. System bandwidth improvements may be generally useful within a substrate drilling system, and such improvements may be particularly advantageous in substrate drilling systems wherein trepanning or similar motion is used for hole formation. Limited rotation motors discussed above may also be employed for drilling other substrates such as electronic packages, semiconductor substrates, and similar workpieces.

Such limited rotation motors may also be employed in substrate marking employing lasers, or laser marking, of for example, semiconductors, wafers and the like on either front or backsides of the substrates. The marks produced by the laser (such as a diode pumped solid state laser), whether on a front or back side, may be formed as a 1D or 2D matrix, and in compliance with various industry standards. The performance of such a system may depend, at least in part, on marking speed, density, and quality, and improvements in limited rotation motor performance may improve marking speed, density and quality. Marking speed over a field, as measured in mm/sec for example, is a function of the laser repetition rate, spot size, and the speeds of the one or motors (e.g., low and fast scan direction motors) used in the system.

In accordance with further embodiments, systems of the invention may be provided for other high speed marking applications in the electronic industry such as, for example, marking of packages or devices in trays, or other similar workpieces.

Limited rotation motors as discussed above may also be employed in laser trimming systems in accordance with further embodiments of the present invention. One or more embodiments of the present invention may be used in a laser trimming system, or in a substrate micromachining system. For example, such a system may provide a method for high-speed, precise micromachining an array of devices (such as resistors), with each of the devices having at least one measurable property (such as resistance). The method includes the steps of: a) selectively micromachining a device in the array to vary a value of a measurable property; b) suspending the step of selectively micromachining; c) while the step of selectively micromachining is suspended, selectively micromachining at least one other device in the array to vary a value of a measurable property; and d) resuming the suspended step of selectively micromachining to vary a measurable property of the device until its value is within a desired range. At least one of the steps of selectively micromachining may include the steps of generating and relatively positioning a laser beam to travel in a first scanning pattern across the devices, superimposing a second scanning pattern with the first scanning pattern and irradiating at least one device with at least one laser pulse.

A micromachining system in accordance with another embodiment of the invention may provide for a fast scan pattern to be carried out using with an acousto-optic deflector, superimposed on a second, lower speed scan pattern that is carried out using a limited rotation motor as discussed above. Generally, the access or retrace time of the acousto-optic deflector is on the order of tens of microseconds. In certain embodiments improved motor speed will directly result in improved trimming speed.

Those skilled in the art will appreciate that numerous modifications and variations may be made to the above disclosed embodiments without departing from the spirit and scope of the invention.

What is claimed is:

1. A position transducer system for a limited rotation motor comprising an illumination source that directs illumination toward an illumination reflector that rotates with a rotor of the limited rotation motor said illumination reflector including a plurality of pairs of reflective and non-reflective areas, and a plurality of pairs of detector areas adjacent said illumination source for receiving modulated reflected illumination from said illumination reflector, said plurality of pairs of detector areas corresponding to said plurality of pairs of reflective and non-reflective areas such that each of said pairs of detector areas receives reflected illumination substantially from only one of a respective pair of reflective and non-reflective areas, and wherein each of said pairs of detector areas includes a first detector area and a second detector area, and at all times during rotation, each of the first detector areas of the plurality of pairs of detector areas receives substantially the same amount of illumination, and each of the second detector areas of the plurality of pairs of detector areas receives substantially the same amount of illumination, said plurality of pairs of detector areas being formed on a printed circuit board that further includes the illumination source mounted thereon such that the illumination source is substantially aligned with the axis of rotation of the limited rotation motor, wherein the illumination source provides substantially point source illumination to said illumination reflector and is substantially co-planar with the plurality of pairs of detector areas, and wherein the plurality of pairs of detector areas substantially surround the illumination source and receive illumination from said illumination reflector.

2. The position transducer system as claimed in claim 1, wherein said illumination source includes a single LED light source.

3. The position transducer system as claimed in claim 1, wherein said reflective areas of said illumination reflector provide specular reflection and said non-reflective areas of said illumination reflector provide illumination absorption.

4. The position transducer system as claimed in claim 3, wherein said illumination reflector includes three sets of specular reflective regions and three sets of absorbing regions.

5. The position transducer system as claimed in claim 1, where said plurality of detector areas includes three pairs of complementary adjacent detector regions.

6. The position transducer system as claimed in claim 5, wherein said plurality of detector areas includes three pairs of complementary adjacent detector regions, the outputs of which are combined to provide relative position information.

7. The position transducer system as claimed in claim 1, wherein said plurality of detector arrays are formed on a monolithic device.

8. The system as claimed in claim 1, the plurality of pairs of reflective and non-reflective areas of said illumination reflector includes three pairs of reflective and non-reflective areas, and wherein the plurality of pairs of detector areas includes three pairs of detector areas.

9. A position transducer system for a limited rotation motor comprising an illumination source that directs illumination toward an illumination reflector that rotates with a rotor of the limited rotation motor and includes a first plurality of pairs of reflective and non-reflective areas, and a plurality of sets of functionally complementary pairs of detector areas that are substantially co-planer with and surround said illumination source for receiving modulated reflected illumination from said illumination reflector, said second plurality of sets of detector areas being formed on a monolithic device that is mounted on a printed circuit board that further includes the illumination source mounted thereon such that the illumination source is substantially aligned with the axis of rotation of the limited rotation motor, wherein said illumination source provides substantially point source non-coherent illumination to said illumination reflector that includes a plurality of sets of reflective areas, and wherein a number of the first plurality is the same as a number of the second plurality such that each of a first detector area of the second plurality of sets of detector areas receives substantially similar illumination, and each of a second detector area of the second plurality of sets of detector areas receives substantially similar illumination.

10. The position transducer system as claimed in claim 9, wherein said plurality of sets of functionally complementary pairs of detector areas are coupled to an output circuit that provides a first combined output signal that is representative of a first combined detector output of each pair of sets of detector areas, and provides a second combined output signal that is representative of a second combined detector output of each pair of sets of detector areas.

11. The position transducer system as claimed in claim 9, wherein said illumination reflector includes three mutually spaced-apart specular reflective surfaces, and said plurality of sets of functionally complementary pairs of detector areas includes three pairs of detector areas.

12. The system as claimed in claim 9, wherein the number of the first plurality and the number of the second plurality is three.

13. A method of providing a relative position signal in a limited rotation motor system, said method comprising the steps of directing illumination from an illumination source toward an illumination reflector that rotates with a rotor of the limited rotation motor having an axis of rotation, said illumination reflector including a plurality of pairs of reflective and non-reflective areas, and receiving modulated reflected illumination from the illumination reflector at a plurality of sets of functionally complementary pairs of detector areas that are substantially co-planer with and surround the illumination source, wherein said plurality of pairs of detector areas correspond to said plurality of pairs of reflective and non-reflective areas such that the rotational movement of each of the pairs of reflective and non-reflective areas is limited to a range that provides that each of said pairs of detector areas receives reflected illumination substantially from only one of a respective pair of reflective and non-reflective areas during operation of the limited rotation motor system, and wherein said plurality of pairs of detector areas each includes a first detector area and a second detector area, and said plurality of pairs reflective and non-reflective areas of said illumination reflector providing that at all times, each of the first detector areas receive substantially the same amount of illumination and each of the second detector areas receive substantially the same amount of illumination, said plurality of sets of detector areas being formed on a printed circuit board that further includes the illumination source mounted thereon, wherein said illumination source provides substantially point source illumination to said illumination reflector and is substantially aligned with the axis of rotation of the axis of rotation of the limited rotation motor, and wherein the plurality of pairs of detector areas substantially surround the illumination source and receive illumination from said illumination reflector.

14. The method as claimed in claim 13, wherein said method further includes the step of providing a first combined output signal that is representative of a first combined detector output of the pairs of sets of detector areas.

15. The method as claimed in claim 14, wherein said method further includes the step of providing a second combined output signal that is representative of a second combined detector output of the pairs of sets of detector areas.

16. The method as claimed in claim 13, wherein said method further includes the step of adjusting a mirror position control signal responsive to the first combined output signal and the second combined output signal.

17. The method as claimed in claim 13, wherein said plurality of detector arrays are formed on a monolithic device.

18. The method as claimed in claim 13, wherein the plurality of pairs of reflective and non-reflective areas of said illumination reflector includes three pairs of reflective and non-reflective areas, and wherein the plurality of pairs of detector areas includes three pairs of detector areas.

* * * * *